United States Patent [19]
Brennan et al.

[11] Patent Number: 5,134,218
[45] Date of Patent: Jul. 28, 1992

[54] HYDROXY-FUNCTIONAL POLY(AMIDE ETHERS) AS THERMOPLASTIC BARRIER RESINS

[75] Inventors: David J. Brennan; Jerry E. White, both of Midland, Mich.

[73] Assignee: The Dow Chemical Company, Midland, Mich.

[21] Appl. No.: 711,001

[22] Filed: Jun. 6, 1991

[51] Int. Cl.$^5$ .................. C08G 59/00; C08G 65/08; C08G 65/14
[52] U.S. Cl. ........................ 528/99; 528/104
[58] Field of Search .................. 528/99, 104

[56] References Cited

U.S. PATENT DOCUMENTS

| | | | |
|---|---|---|---|
| 2,602,075 | 7/1952 | Carpenter et al. | 528/104 |
| 3,305,528 | 2/1967 | Wynstra et al. | 528/104 |
| 3,477,990 | 11/1969 | Dante et al. | 528/99 |
| 3,514,418 | 5/1970 | Schwarzer | 528/104 |
| 4,367,328 | 1/1983 | Bertram et al. | 528/99 |
| 4,395,533 | 7/1983 | Bertram et al. | 528/99 |
| 4,398,002 | 8/1983 | Bertram et al. | 528/99 |
| 4,410,681 | 10/1983 | Prindle | 528/99 |
| 4,837,293 | 6/1989 | Silvis et al. | 528/99 |

Primary Examiner—John C. Bleutge
Assistant Examiner—Frederick Krass

[57] ABSTRACT

Poly(hydroxy amide ethers) which exhibit high barrier properties are prepared by contacting one or more amide-containing bisphenols and an epihalohydrin. These polymers are suitable for use in the manufacture of articles such as rigid containers and flexible films exhibiting high barrier to oxygen transmission in moist environments.

12 Claims, No Drawings

HYDROXY-FUNCTIONAL POLY(AMIDE ETHERS) AS THERMOPLASTIC BARRIER RESINS

BACKGROUND OF THE INVENTION

This invention relates to thermoplastic polymers having aromatic ether moieties in the backbone chain and pendant hydroxyl moieties and to articles prepared from such polymers.

Hydroxyphenoxyether polymers are known to be useful in the fabrication of articles exhibiting barrier properties. See, for example, Reinking et al, *J. Poly Sci.*, Vol. 7, pp. 2135-2144, pp. 2145-2152 and pp. 2153-2160 (1963) and *Encyclopedia of Polymer Science and Technology*, Vol. 10, pp. 111-122. Such polymers generally have only moderate oxygen barrier. i.e., they generally exhibit oxygen transmission rates of 2 to 75 cm$^3$-mil/100 in$^2$-atm-day.

In view of the limited barrier properties of the prior art polymers having pendant hydroxyl moieties and phenoxyether moieties, it would be highly desirable to provide a polymer having a genuinely high barrier (i.e., oxygen transmission rate less than 1 cm$^3$-mil/100 in$^2$-atm-day) to oxygen. Polymers that retain such high barrier in both dry and moist environments would be especially desirable.

SUMMARY OF THE INVENTION

The present invention is, in one aspect, a normally solid thermoplastic barrier polymer having aromatic ether moieties and amide moieties in the backbone chain and pendant hydroxyl moieties and is prepared by reacting one or more amide-containing bisphenols and an epihalohydrin. Surprisingly, the polymer of this invention, hereinafter called a hydroxy-functional poly(amide ether), exhibits thermoplastic character and excellent barrier to oxygen. By "normally solid" it is meant that the polymer is solid at ambient temperatures, e.g., 15°-35° C.

In another aspect, this invention is a container suitable for packaging oxygen-sensitive materials wherein the container is fabricated of the hydroxy-functional poly(amide ether). In yet a further aspect, this invention is a substantially impermeable film or coating of the polymer.

For the purposes of this invention, the term "barrier polymer" means that the polymer exhibits an oxygen transmission rate which is less than 2, preferably less than 1, cubic centimeters-mil/100 inch$^2$ atmosphere-day.

In addition to their use as barrier containers and films, the polymers of this invention are also useful as molding, extrusion and casting resins.

DETAILED DESCRIPTION OF ILLUSTRATIVE EMBODIMENTS

Preferably, the poly(hydroxy amide ether) has repeating units represented independently by the formulae:

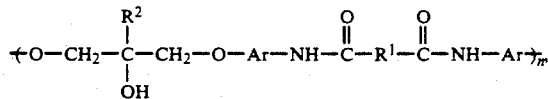

-continued

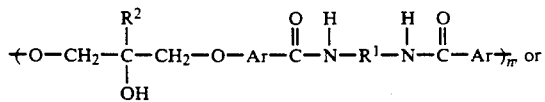

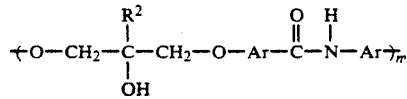

wherein each Ar is independently a divalent aromatic moiety, each R$^1$ is a predominantly hydrocarbylene moiety, such as a divalent aromatic moiety, or divalent heteroaromatic moiety, each R$^2$ is hydrogen or a monovalent aliphatic moiety and n is 10 to 1000.

"Predominantly hydrocarbylene" is defined as a divalent radical that is predominantly hydrocarbon, but which optionally contains a minor amount of heteroatomic moiety such as oxygen, sulfur, imino, sulfonyl, sulfoxyl, and the like.

In the more preferred polymers, Ar is arylene or substituted arylene wherein the substituent may be alkyl, aryl, halo, nitro, or cyano; R$^1$ is predominantly hydrocarbylene such as (1) alkylene or cycloalkylene which has from 1 to about 10 carbons which may contain a heteroatomic moiety such as oxygen, sulfur, sulfonyl, or sulfoxyl and (2) arylene which has from 5 to 25 carbons, may contain a heteroatomic moiety and may be substituted with alkyl, alkoxy, halo, nitro, or cycloalkyl groups; and R$^2$ is hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepare the poly(hydroxy amide-ethers). Examples of such substituents include cyano, halo, amido, hydroxy and hydroxyalkyl.

In the most preferred poly(hydroxy amide ethers), Ar is phenylene or substituted phenylene wherein the substituent is alkyl, alkoxy, halo, or nitro, with phenylene being especially preferred; R$^1$ is (1) alkylene having from 1 to 10 carbons such as methylene, ethylene, n-propylene, n-butylene, n-pentylene, n-hexylene, n-octylene; (2) alkyleneoxyalkylene such as methylene, ethyleneoxyethylene; (3) alkylene thioalkylene such as ethylenethioethylene or alkylenesulfonylalkylene such as ethylenesulfonylethylene; (4) alkyleneoxyaryloxyalkylene such as ethyleneoxyphenoxyethylene: (5) alkylenearylalkylene such as methylenephenylmethylene; or (6) arylene such as phenylene or substituted arylene such as halophenylene: R$^2$ is hydrogen or alkyl having from 1 to 4 carbons such as methyl, ethyl, propyl, and butyl, with hydrogen being especially preferred, and n is 100 to 400.

The poly(hydroxy amide ethers) are preferably prepared by contacting a bis(hydroxyphenylamido)alkane or arene, or a combination of 2 or more of these compounds, hereinafter referred to as amide-containing bisphenols, such as N,N'-bis(3-hydroxyphenyl) adipamide or N,N'-bis(3-hydroxyphenyl) glutaramide, with an epihalohydrin under conditions sufficient to cause the hydroxyl moieties to form ether linkages and pendant hydroxyl moieties. Conditions conventionally employed in the reaction of epoxides with phenols to form ether linkages are suitably employed in preparing the resins of this invention. Examples of such suitable conditions are set forth in U.S. Pat. No. 3,305,528 which is hereby incorporated by reference in its entirety. Preferred conditions for preparing such resins are set forth in the following working examples.

The amide-containing bisphenol is prepared by contacting a suitable diacid or diacid halide with a substantial excess of an aminoarenol under conditions sufficient to cause reaction of the amine moieties with the acid halide moieties to form amide moieties. Examples of diacids and diacid halides that are suitably employed include acids and acid halides, preferably chlorides of the following acids: oxalic, adipic, malonic, succinic, glutaric, fumaric, maleic, pimelic. suberic, azelaic, sebacic, terephthalic, isophthalic and phenylenediacetic. Examples of aminoarenols suitably employed include the following: aminophenols such as p-aminophenol and m-aminophenol, aminonaphthols and other aminohydroxyarenes. Conditions conventionally employed for the reaction of acid chlorides with amines to form amides are suitably employed to form the amide-containing bisphenols of this invention. Examples of such suitable conditions are set forth according to J. Preston, *J.Polym.Sci.*, Vol. 8, p. 3135–3144 (1970).

Alternatively, the amide-containing bisphenol can be prepared by contacting a suitable diamine with a hydroxybenzoic acid derivative such as a hydroxybenzoic acid ester, an acetoxybenzoyl halide, or acetoxybenzoic acid, under conditions sufficient to cause reaction of the amine group with the carboxylic acid or carboxylic acid derivative to form amide moieties, followed by removal of the acetyl group in the case of the acetoxy species. Examples of diamines that are suitably employed include ethylenediamine, 1,3-propanediamine, 1,4-butanediamine, 1,5-pentanediamine, hexamethylenediamine, 1,3-phenylenediamine, 1,4-phenylenediamine, and m-xylylenediamine. Examples of hydroxybenzoic acid derivatives that can be used include methyl 4-hydroxybenzoate, ethyl 4-hydroxybenzoate, phenyl 4-hydroxybenzoate, methyl salicyclate, phenyl salicylate, 4-acetoxybenzoyl chloride, 4-acetoxybenzoic acid, and other derivatives of carboxyhydroxyarenes. Preferred conditions for preparing the amide-containing bisphenols are set forth hereafter in the working examples.

Suitable epihalohydrins include, for example, epichlogohydrin, epibromohydrin, epiiodohydrin, methyl epichlorohydrin, methylepibromohydrin, methylepiiodohydrin, ethylepichlorohydrin, ethylepibromohydrin, ethylepiiodohydrin and mixtures thereof.

The barrier containers, films and coatings of this invention are fabricated from the hydroxy-functional poly(amide-ether) using conventional fabricating techniques for normally solid, thermoplastic polymers such as extrusion, compression molding, thermoforming, injection molding and similar fabrication techniques commonly employed to produce such articles.

The following working examples are given to illustrate the invention and should not be construed as limiting its scope. Unless otherwise indicated, all parts and percentages are by weight.

EXAMPLE 1

A. Preparation of N,N'-bis(3-hydroxyphenyl)adipamide

A solution of adipoyl chloride (5.5 g, 0.03 mol) in dry tetrahydrofuran (THF, 50 mL) is added dropwise to a magnetically stirred solution of 3-aminophenol (13.0 g, 0.12 mol) in 150 mL of THF. A precipitate forms after 10–15 minutes and is collected by filtration, washed with water, washed with a mixture of water and tetrahydrofuran and recrystallized from an ethanol/water mixture. Analysis of the resulting 8.86 g of white solid indicates it to have the following structure:

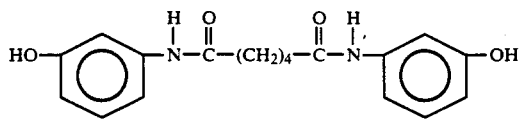

Preparation of N,N'-bis(3-hydroxyphenyl)glutaramide

A solution of glutaryl chloride (42.25 g, 0.25 mol) in dry THF (300 mL) is added dropwise to a magnetically stirred solution of g-aminophenol (110.4 g. 1.01 mol) in 1000 mL of THF. After stirring at 25° C. for 18 hours, the solution is heated to 66° C. for 4 hours, then cooled to 25° C. Precipitated 3-aminophenol hydrochloride is collected by filtration and solvent is removed from the resulting filtrate under reduced pressure to yield an oil. The oil is poured into water, which causes precipitation of an amber-colored solid which is recrystallized twice from an ethanol/water mixture to yield 56.1 g of an off-white solid with the following structure:

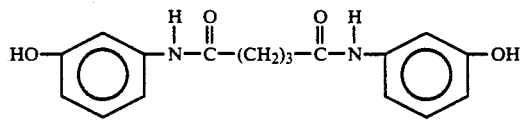

C. Preparation of α,α'-bis(4-hydroxybenzamido)-1,3-xylene

A solution of m-xylylenediamine (10.22 g, 0.0750 mol) and triethylamine (30.4 g, 0.30 mol) in dry THF (50 ml) is added to a mechanically stirred solution of 4-acetoxybenzoyl chloride (29.79 g, 0.15 mol) in dry tetrahydrofuran (300 mL) which caused a precipitate to form immediately. On completion of addition, the mixture is stirred for 16 hours at 25° C., then the precipitated solid is collected by filtration. The solid is washed with water and is treated with 35 mL of 5N NaOH (0.175 mol) in 400 mL of boiling 1:1 ethanol/water for two hours. The solution is acidified with 15 mL of concentrated HCl and allowed to cool, which causes a white solid to form. The solid is recrystallized twice from an ethanol/water mixture to yield 20.8 g of a white solid that is analyzed by proton and carbon-13 NMR spectroscopy and determined to have the following structure:

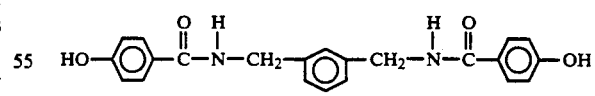

Preparation of Polymer 1a

To a 100 mL polymerization kettle is added N,N'-bis(3-hydroxyphenyl)glutaramide (15.62 g, 0.050 mol), ethanol (30 mL), epichlorohydrin (4.63 , 0.050 mol), and sodium hydroxide (2.00 g, 0.050 mol) dissolved in water (30 mL). The flask is fitted with a top which contained a thermometer, an overhead mechanical stirrer shaft, and a nitrogen inlet adapter. The contents of the flask are stirred at 25° C. under nitrogen for 17 hours, after which more sodium hydroxide (0.30 g, 0.0075 mol) in water (5 mL) is added to the reaction mixture The contents of the flask are then heated at 80 to 90° C. for eight hours, after which time a polymeric material precipitates from solution. The polymeric mass is superficially washed with water, is dissolved in DMF (75 mL), then is precipitated into a cold solution of 3:1 methanol/water (400 mL) in a high speed blender. After washing with methanol (100 mL) and water (100 mL), the off-white polymer is redissolved in 100 mL of THF/water (95/5) to which acetic acid (10 mL) is added. The polymer is precipitated and washed a second time, then is dried in vacuo at 80° C. for 24 hours. The polymer has repeating units represented by the formula:

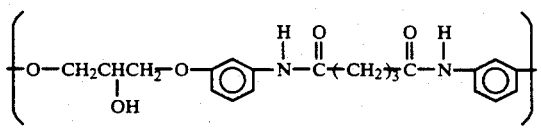

E. Preparation of Polymer 1b

To a 500 mL polymerization kettle is added N,N'-bis(3-hydroxyphenyl)adipamide (82.1 g, 0.250 mol), epichlorohydrin (23.13 g, 0.250 mol), propylene glycol monophenyl ether (150 mL), and sodium hydroxide (10.00 g, 0.250 mol) dissolved in water (150 mL). The flask is fitted with a top which contained a thermometer, an overhead mechanical stirrer shaft and a nitrogen inlet adapter. The contents of the flask are stirred at 25° C. under nitrogen for 16 hours. Additional sodium hydroxide (1.50 g, 0.0375 mol) in water (20 mL) is added to the reaction mixture. The contents of the flask are then heated at 95° C. for 7 hours, after which time the viscosity of the reaction mixture increases. The mixture is cooled to 25° C. and the non-polymeric supernatant liquid is decanted. The polymeric mass is superficially washed with water several times and is dissolved in DMF (200 mL). The polymer is precipitated into a cold solution of 3:1 methanol/water (2 L) in a high speed blender, then is washed with methanol (1 L) and water (1 L). The off-white polymer is collected via filtration, is redissolved in wet THF (500 mL), and is precipitated a second time as described previously. The polymer is washed by stirring in 50% aqueous methanol overnight, is collected via filtration, is air-dried, and then is dried in vacuo at 80° C. for 24 hours. The polymer has repeating units represented by the formula:

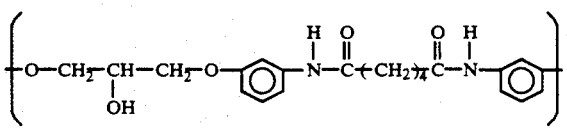

F. Preparation of Polymer 1c

To a 100 mL polymerization kettle is added α,α'-bis(4-hydroxybenzamido)-1,3-xylene (11.29 g, 0.030 mol), propylene glycol monophenyl ether (35 mL), epichlorohydrin (2.87 g, 0.030 mol), and sodium hydroxide (1.20 g, 0.030 mol) dissolved in water (10 mL). The flask is fitted with a top which contained a thermometer, an overhead mechanical stirrer shaft, and a nitrogen inlet adapter. The contents of the flask are stirred at 25° C. under nitrogen for 16 hours, after which time more sodium hydroxide (0.18 g, 0.0045 mol) in water (3 mL) is added to the reaction mixture. The contents of the flask are then heated at 95° C. for three hours, after which time more propylene glycol monophenyl ether (10 mL) is added. The mixture is heated at 95° C. for an additional six hours, during which time a polymeric material precipitates from solution. The polymer is dissolved in DMF and precipitates into a cold solution of 3:1 methanol/water (400 mL) in a high speed blender. After washing with methanol (100 mL) and water (100 mL). the polymer is redissolved in 100 mL of DMF. After a second precipitation and washing, the polymer is then dried in vacuo at 80° C. for 25 hours. The polymer has repeating units represented by the formula:

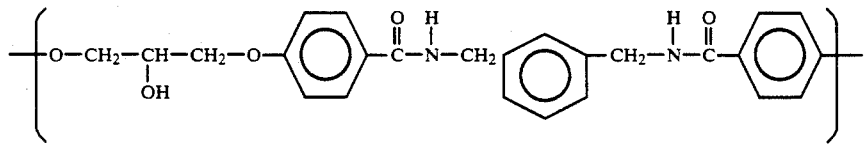

Q. Barrier Testing

Specimens (10 cm×10 cm ×b 0.013 cm) for oxygen barrier evaluations are prepared by compression molding samples (3.5 g) of Polymers 1a, 1b and 1c between Teflon sheets in a brass template at 200° C. to 250° C. at 500 psi (3.5 mPa) for 8–10 minutes, then at 40,000 psi (275 mFa) for 2–4 minutes and then cooled at 40,000 psi (275 mPa) for 10 minutes. Oxygen transmission rates are then measured for the samples at 23° C. in accordance with ASTM method D-3985-81.

The yield, inherent viscosity (ninh), glass transition temperature ($T_g$), crystalline melting temperature ($T_m$) and oxygen transmission rate (OTR) at 70%–80% relative humidity of $O_2$ data are given in Table 1.

TABLE I

| Polymer | Yield (%) | $\eta_{inh}$ (dL/g)[a] | $T_g$ (°C.) | $T_m$ (°C.) | Oxygen Transmission Rate[b] | |
|---|---|---|---|---|---|---|
| | | | | | OTR[c] | RH (%)[d] |
| 1 a | 65 | 0.54 | 105 | — | 0.11 | 74–80 |
| 1 b | 81 | 0.44 | 107 | 159 | 0.19 | 70–80 |
| 1 c | 62 | 0.43 | 142 | — | 0.51 | 59–61 |

[a]Concentration of 0.25 g/50 mL in DMF at 25° C.
[b]ASTM method D3985-81
[c]Oxygen transmission rate (OTR) in cc · mil/100 in² · atm · day
[d]Relative Humidity (RH) of oxygen used to determine OTR.

As evidenced by the data in Table 1, the polymers of this invention exhibit excellent barrier to oxygen transmission in a wet environment.

What is claimed is:

1. A thermoplastic barrier polymer having aromatic ether moieties and amide moieties in its backbone chain and pendent hydroxyl moieties and having repeating units represented by the formula:

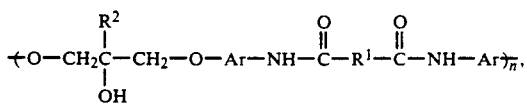

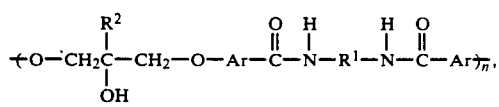

or

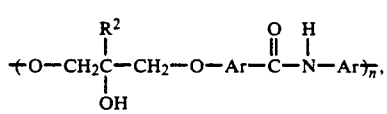

wherein each Ar is independently a divalent aromatic moiety, each $R^1$ is independently a predominantly hydrocarbylene moiety, divalent aromatic moiety, or divalent heteroaromatic moiety, each $R^2$ is independently hydrogen or a monovalent aliphatic moiety and n is 10 to 1000.

2. The polymer of claim 1 wherein Ar is arylene or substituted arylene wherein the substituent is alkyl, aryl, halo, nitro, or cyano; $R^1$ is predominantly hydrocarbylene chosen from (1) alkylene which has from 1 to about 10 carbons which may contain a heteroatomic moiety chosen from oxygen, sulfur, sulfonyl, or sulfoxyl or (2) arylene which has from 5 to 25 carbons, may contain a heteroatomic moiety and may be substituted with alkyl, alkoxy, halo, nitro, or cycloalkyl groups; and $R^2$ is hydrogen or a hydrocarbyl or substituted hydrocarbyl wherein the substituent(s) is a monovalent moiety which is inert in the reactions used to prepare the polymer.

3. The polymer of claim 1 prepared by contacting one or more amide-containing bisphenols and an epihalohydrin.

4. The polymer of claim 1 prepared by contacting one or more amide-containing bisphenols and an epihalohydrin.

5. The polymer of claim 2 having repeating units represented by the formula:

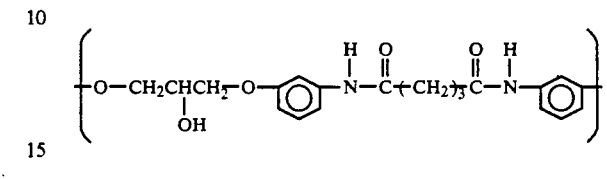

6. The polymer of claim 2 having repeating units represented by the formula:

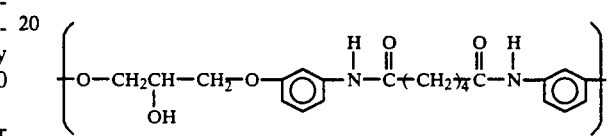

7. The polymer of claim 2 having repeating units represented by the formula:

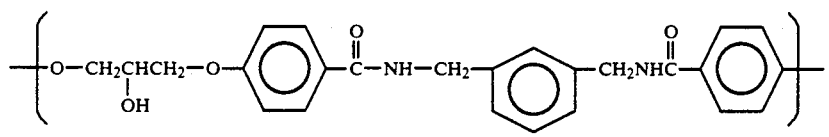

8. The polymer of claim 3 wherein the amide-containing bisphenol is selected from the group consisting of N,N'-bis(3-hydroxyphenyl)adipamide, N,N'-bis(3-hydroxyphenyl)glutaramide and α,α'-bis(4-hydroxybenzamido)-1,3-xylene.

9. The polymer of claim 3 wherein the epihalohydrin is selected from the group consisting of epichlorohydrin, epibromohydrin, and epiiodohydrin.

10. The polymer of claim 1 in the form of a barrier film.

11. The polymer of claim 1 in the form of a barrier container.

12. The polymer of claim 1 in the form of a barrier coating.

* * * * *

UNITED STATES PATENT AND TRADEMARK OFFICE
CERTIFICATE OF CORRECTION

PATENT NO. : 5,134,218

DATED : July 28, 1992

INVENTOR(S) : David Brennan and Jerry E. White, both of Midland, Mich.

It is certified that error appears in the above-identified patent and that said Letters Patent is hereby corrected as shown below:

Column 7, lines 1 to 5, delete

"
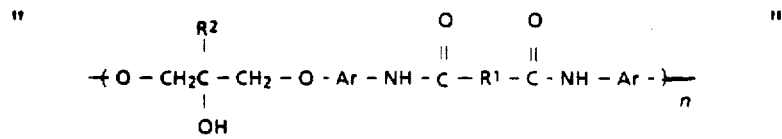
"

and insert

--
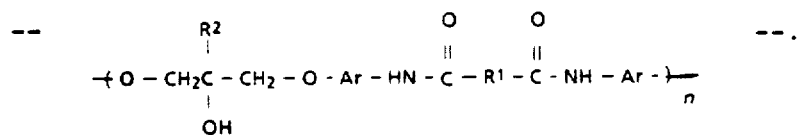
--.

Column 8, lines 10 to 15, delete

"
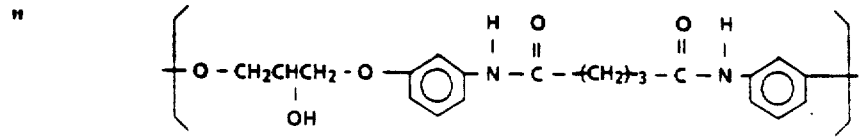
"

and insert

--
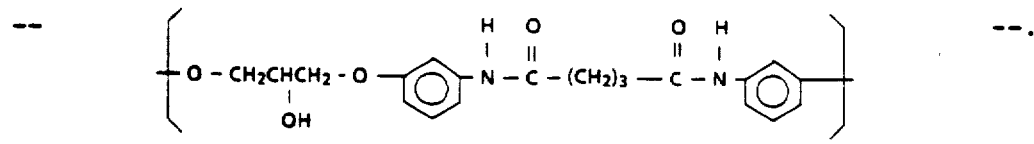
--.

UNITED STATES PATENT AND TRADEMARK OFFICE
CERTIFICATE OF CORRECTION

PATENT NO. : 5,134,218
DATED : July 28, 1992
INVENTOR(S) : David Brennan and Jerry E. White, both of Midland, Mich.

It is certified that error appears in the above-indentified patent and that said Letters Patent is hereby corrected as shown below:

Column 8, lines 20 to 25, delete

"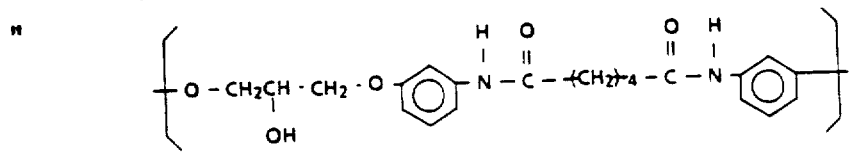"

and insert

--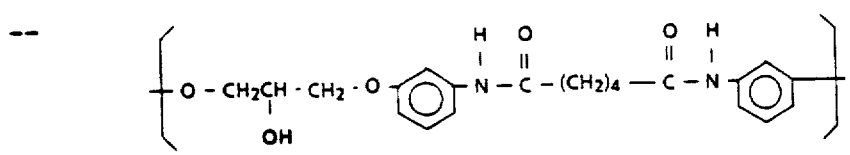--.

Signed and Sealed this

Twenty-third Day of November, 1993

Attest:

BRUCE LEHMAN

Attesting Officer  Commissioner of Patents and Trademarks